United States Patent
Sun et al.

(10) Patent No.: US 10,161,970 B2
(45) Date of Patent: Dec. 25, 2018

(54) SEQUENCE BASED MOVER IDENTIFICATION

(71) Applicant: Rockwell Automation Technologies, Inc., Mayfield, OH (US)

(72) Inventors: Xikai Sun, Shanghai (CN); Linglai Li, Shanghai (CN); Peter M. Smit, Mount Sinai, NY (US); Oliver C. Haya, Milwaukee, WI (US); Mark R. Cooper, Eden Prairie, MN (US); Nanwei Yao, Edina, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 106 days.

(21) Appl. No.: 15/470,079

(22) Filed: Mar. 27, 2017

(65) Prior Publication Data

US 2018/0276436 A1   Sep. 27, 2018

(51) Int. Cl.
*G01R 15/20* (2006.01)

(52) U.S. Cl.
CPC ......... *G01R 15/205* (2013.01); *G01R 15/202* (2013.01)

(58) Field of Classification Search
CPC ..... G01R 15/202; G01R 15/148; G01R 39/06
See application file for complete search history.

(56) References Cited

U.S. PATENT DOCUMENTS

| 9,958,852 | B2 * | 5/2018 | Bhatt | G05B 19/19 |
| 2010/0212264 | A1 * | 8/2010 | Fischer | B65B 5/105 |
| | | | | 53/448 |
| 2015/0048817 | A1 | 2/2015 | Prussmeier | |
| 2016/0320212 | A1 * | 11/2016 | van de Kerkhof | G01D 5/347 |

* cited by examiner

*Primary Examiner* — Jermele M Hollington
*Assistant Examiner* — Alvaro Fortich
(74) *Attorney, Agent, or Firm* — Boyle Fredrickson, SC

(57) ABSTRACT

The present invention provides a mover traveling along a track, the mover system having a mover frame supporting a mover sensor element and a track frame providing a path for which the mover frame travels and supporting track sensor elements for interacting with the mover sensor element of the mover frame. The interaction between the mover sensor element and track sensor elements provides an identification signal of each mover and the identification signal of each mover on the track is arranged according to a cyclic sequence where unique contiguous substrings occur only once within the sequence.

19 Claims, 4 Drawing Sheets

SEQUENCE BASED MOVER IDENTIFICATION

CROSS REFERENCE TO RELATED APPLICATIONS

—

STATEMENT REGARDING FEDERALLY SPONSORED RESEARCH OR DEVELOPMENT

—

BACKGROUND OF THE INVENTION

The present invention relates to motion control systems and, more specifically, to mover systems with identification schemes to provide identification of movers and their sequences on a track.

Mover systems utilizing linear drives can be used in a wide variety of processes (e.g. packaging, assembly automation, processes involving use of machine tools, etc.) and provide an advantage over conventional conveyor belt systems to provide flexible, extremely high speed movement, and mechanical simplicity. The mover systems provide a set of independently moveable "movers" supported on a track that holds individually controllable electric coils. Successive activation of the coils by drive electronics and a control system create a magnetic field that moves and relocates the movers along the track. Sensors may be spaced at fixed positions along the track and/or on the movers to provide information about the position and speed of the movers.

More specifically, magnetic sensors allow the movement of the movers to be detected with extreme accuracy providing submillimeter positioning. For example, by detecting the presence and effect of externally applied magnets attached to the movers, the magnetic sensors can detect the location of a mover and use it with a feedback control system to provide independent movement and positioning of each mover on the track.

In many applications, the movers provide packaging and materials handling of diverse objects along unique paths to highly specific positions along the track. Different sizes of mover frames (e.g., small, medium, and large frames) help to accommodate the different load sizes. The objects of each load, the size of each mover frame, and the order of the movers are prearranged so that each mover travels a particular path with respect to other movers on the track. When movers are installed and uninstalled onto the track, for example, for routine maintenance or repair, it is desired to discern the position and order of each mover before operation resumes. For example, if the person conducting maintenance or repair replaces the mover in the wrong position, the unique sequence of movers will be incorrect and will need to be corrected for operation.

One mode of identifying movers is the use of radio frequency identification (RFID) which detects RFID tags on the movers as the movers pass through a RFID reader positioned on or near the track. In this method, an application program will typically provide a system start-up operation which moves the movers along the track so that each mover passes near the RFID reader. Each mover is installed with a unique tag carrying electronically stored information such as a unique multi-bit serial number associated with each mover. The tag will transmit an identifying signal that is read by the RFID reader so that the identity of the mover can be determined. Use of RFID in product delivery systems is described in U.S. Pat. No. 7,931,197, entitled "RFID-based product manufacturing and lifecycle management," assigned to the present applicant, and hereby incorporated by reference.

The use of RFID tags and readers requires unique identifying information to be installed on each mover and a database of identifying information to be stored in a system database. Also each mover must pass in close proximity to a RFID reader so that the RFID tags can be read. This process can be time consuming and intrusive, especially when resuming mover operations already in process.

SUMMARY OF THE INVENTION

The present inventors have determined that identifying the movers with simple non-unique markers (for example a single binary one or zero bit) can be used to greatly simplify the mover identification process. Ambiguity caused by the simple marking system can be resolved by arranging the markers in unique sequences identifying a mover after a relatively short subset of that sequence to help movers to be identified quickly and with faster and more accurate error detection. The sequence may be comprised of binary bits so that movers can be marked and identified using simple and noise resistant detection schemes. Also, arranging detectors along the entire length of the mover track allows mover identification to be determined without having to move the movers along the track in close proximity to a single detector.

Specifically, in one embodiment, the invention provides a mover system providing a mover traveling along a track, the mover system having a mover frame supporting a mover sensor element; and a track frame providing a path along which the mover frame travels and supporting track sensor elements for interacting with the mover sensor element of the mover frame; where the interaction between the mover sensor element and track sensor elements provides an identification signal for each mover that is not unique to that mover, and where the identification signal for each mover on the track follows a cyclic sequence where contiguous substrings of the cyclic sequence of a predetermined length less than the length of the cyclic sequence occur only once within the sequence.

It is thus a feature of at least one embodiment of the invention to permit movers to be simply identified and for unique mover order to be determined after detection of a small number of movers.

The identification signal may be binary, being either a logical true or logical false value.

It is thus a feature of at least one embodiment of the invention to mark movers easily using a simple identification scheme, such as binary bits.

The predetermined length may be less than one half the number of movers or less than one-fourth the number of movers. The cyclic sequence may provide the smallest possible predetermined length for the number of movers.

It is thus a feature of at least one embodiment of the invention to sample a small subset of movers to reduce the time needed to identify the entire mover sequence.

The cyclic sequence may be a De Bruijn sequence of order n on a size-k alphabet where n is the predetermined length and k is the number of movers where every possible order n string occurs once within the sequence as a contiguous subsequence.

It is thus a feature of at least one embodiment of the invention to make use of a studied mathematical sequence to minimize the delay time for which a mover can be identified or errors detected or corrected.

The mover sensor element may be at least one of a permanent magnet, electromagnetic magnet and temporary magnet.

It is thus a feature of at least one embodiment of the invention to use simple low cost magnets that can be installed (or uninstalled) on preexisting movers. The magnets provide non-unique markers and can be easily replaced without using unique tags, e.g., RFID tags, for each mover.

The track sensor elements may be at least one of a flux gate switch, Hall effect sensor, giant magnetoresistance (GMR) sensor, magnetic tunneling junction (MTJ) sensing, and anisotropic magnetoresistance (AMR) sensor.

It is thus a feature of at least one embodiment of the invention to use low cost detectors that can be arranged along the entire length of the track to detect the movers at any position along the track. Detection can occur immediately at startup without having to move the movers, reducing noise.

The track sensor elements may be equally spaced along the track wherein the spacing of the track sensor elements is less than half a width of the movers, the width extending along the direction of the track.

It is thus a feature of at least one embodiment of the invention to space the low cost sensor elements apart so that a detection range of the sensor element permits detection of only one mover at a time so that detection is accurate.

An electronic computer communicating with the track sensor elements and electronic memory may execute a program to: receive an output signal of the track sensor elements to produce a sequence of signals; sample n consecutive characters of the sequence of signals to determine a unique subsequence; determine an identity of each mover based upon the unique subsequence. The number n may be less than the total number of movers. The program may compare the sequence of the movers with a stored sequence; and produce an error signal if the sequence does not match the stored sequence.

It is thus a feature of at least one embodiment of the invention to use the unique sequence of movers to quickly detect errors in the mover order (i.e., identify the mover(s) that are in the wrong order or have the wrong mover identification). The system may resume operation after an error is detected by using a built-in redundancy that allows the sequence error to be corrected in software instead of needing to physically move the "out of place" movers to the right positions. The built-in redundancy allows the proper mover identification sequence to be determined despite the error and for the operation to resume.

A second mover magnetic element may be supported on the mover frame and second track sensor elements may interact with the second mover magnetic element of the mover frame where the interaction between the second mover magnetic element and the second track sensor elements provides a mover location of each mover.

It is thus a feature of at least one embodiment of the invention to provide separate position monitoring of the movers. The position monitoring is used to determine the location of the movers so that the proper identification sensors are read, for example, distinguishing a mover without a magnet from the absence of a mover at any particular location.

The first and second track sensor elements are installed on a common printed circuit board (PCB).

It is thus a feature of at least one embodiment of the invention to use the preexisting control system so that hardware and communication channels can be shared.

The track sensor elements may be configured to detect the identification signal of each mover when the movers are stationary.

It is thus a feature of at least one embodiment of the invention to reduce the time and noise associated with moving the movers along the track.

The present invention also provides a mover system providing a mover traveling along a track, the mover system having a mover frame supporting a magnetic element; a track frame providing a path for which the mover frame travels and supporting sensor elements for interacting with the magnetic element of the mover frame; wherein the interaction between the magnetic element and sensor elements provides a binary identification character for each mover; and wherein the binary identification character of n movers on the track is arranged in a De Bruijn sequence.

The present invention also provides a method of identifying movers supporting magnetic elements on a track assembly supporting sensor elements, the method comprising the steps oft mounting the movers to the track assembly; receiving a magnetic character of the sensor elements to produce a sequence; sampling consecutive characters of the sequence to define a unique subsequence; and determining an identity of each mover according to the unique subsequence.

The method may include comparing the sequence to a pre-stored sequence and detecting a discrepancy between the sequence and the pre-stored sequence.

These particular objects and advantages may apply to only some embodiments falling within the claims and thus do not define the scope of the invention.

DETAILED DESCRIPTION OF THE PREFERRED EMBODIMENT

Figure 1:
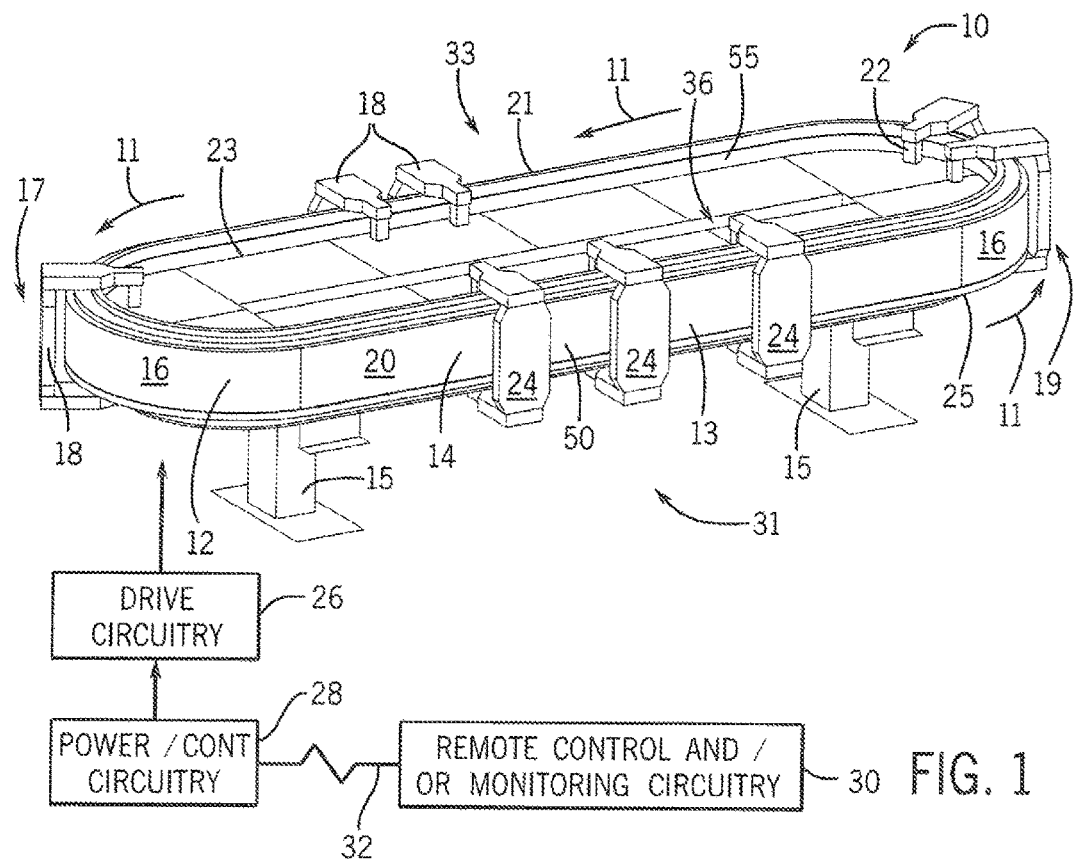
FIG. 1 is a perspective view of a transport system of the present invention illustrating an oval track with several movers positioned for movement along the oval track.

Turning now to the drawings, and referring first to FIG. 1, a transport system 10 for moving articles or products may include a track 12 providing a generally closed loop supporting a set of movers 18 movable along the track 12 in a transport direction 11 or circumferential path. In one embodiment, the loop of the track 12 may be positioned to lie in a horizontal plane as depicted and may be supported above the ground by a pair of vertically extending legs 15 extending downward from the track 12 toward the ground from diametrically opposed sides 17 and 19 of the track 12.

In the illustrated embodiment, the track 12 may have a stadium shape, being a rectangle capped by semicircles, and may comprise of straight track modules 14 and curved track modules 16. The straight track modules 14 provide linear open ended segments while the curved track modules 16 provide semicircle arched segments which connect at their ends to the straight sections to form closed loop tracks 12. As illustrated, one or more straight track modules 14 extend along a front side 31 of the track 12 and one or more straight track modules 14 extend along a backside 33 of the track 12. The two curved track modules 16 extend along the left 17 and right 19 ends of the track 12, respectively, connecting with the front and back straight track modules 14 to form an elongated oval shaped platform. It is understood that the modules 14, 16 are generally self-contained and mountable in various physical configurations.

The modules 14, 16 form a vertically extending wall 13 forming an oval loop extending around an outer periphery of the track 12. The vertically extending wall 13 is defined by an inner surface 23 of the wall 13 opposite an outer surface 20 of the wall 13 connected at their upper ends by a top edge 21 and at their lower ends by a lower edge 25. An interior of the track 12 is defined by a central opening 36 in the center of the track 12 free from vertical obstruction.

A series of parallel coils 50 are installed proximate the outer surface 20 of the vertically extending wall 13. Drive circuitry 26 may be included in each module 14, 16 to allow for controlled power signals to be applied to the coils 50 in order to drive and position a plurality of movers 18 appropriately around the track 12. In the illustrated embodiment, the track modules 14, 16 are mounted end-to-end and interconnected with one another and/or with the power and control system 28 to receive signals used to power the coils 50.

Figure 2:
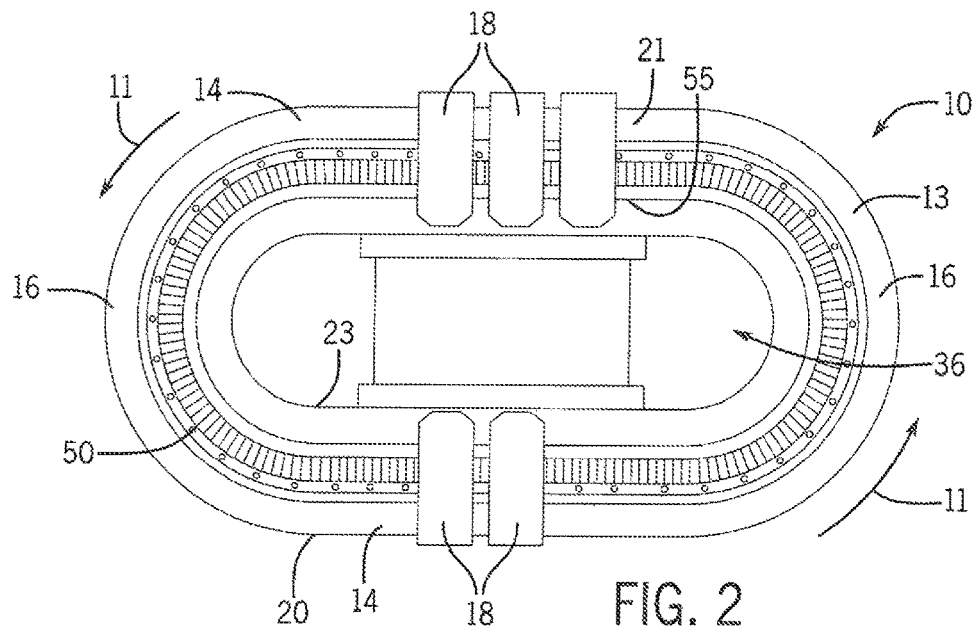
FIG. 2 is a top view of a similar transport system in which movers are positioned on top of the track instead of along a side wall of the track as shown in FIG. 1.

FIG. 2 illustrates an alternative configuration where rather than the motor coils 50 being positioned around the periphery of the outer surface 20 of the vertically extending wall 13, coils 50 are positioned around the top edge 21 of the vertically extending wall 13, in a generally planar arrangement. Other than the position of the motor coils 50, the drive circuitry 26 operates in a similar manner as described with respect to the embodiment shown in FIG. 1.

Referring to FIGS. 1 and 2, the drive circuitry 26 provides signals to each track module 14, 16, and specifically, individual coils 50 of the track modules 14, 16 to create electromotive forces that interact with a magnetic array 40 on the movers 18 to drive the movers 18 to specific locations, and at specific velocity and accelerations. This drive circuitry 26 may typically include inverter circuitry that makes use of power electronic switches to provide drive power to the individual coils 50 of each module in a controlled manner. In some embodiments, the drive circuitry 26 may be included in each individual module 14, 16, and signals provided to the drive circuitry 26 by power and control system 28. Various remote control and/or monitoring circuitry 30 may be provided and this circuitry may be linked to the system by one or more networks 32. Such remote circuitry may generally allow for coordination of the operation of the transport system with other automation components, machine systems, and manufacturing and material handling machines.

Sensor arrays 55 are installed on the inner surface 23 of the vertically extending wall 13 and provided on each track module 14, 16 to interact with corresponding magnet components 22 of the movers 18. The sensor arrays 55 may be mounted on a printed circuit board (PCB) carrying different electronic components. The sensor arrays 55 will typically provide feedback that can indicate the position and identity of the movers 18, and can be used to derive velocity, acceleration, jerk and other motion parameters and mover identity and sequence. The sensor arrays 55 may comprise magnetic sensors such as flux gate, Hall effect, variable reluctance (VR), giant magnetoresistance (GMR), magnetic tunneling junction (MTJ), anisotropic magnetoresistance (AMR), or any other suitable devices.

Figure 3:
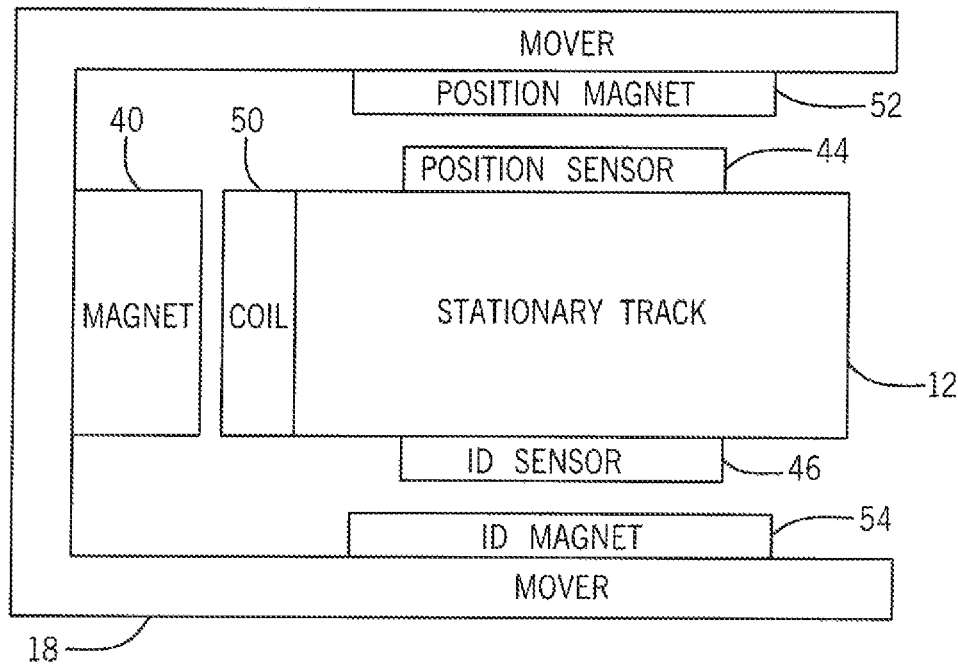
FIG. 3 is a representative diagram showing the interaction of the position and identification sensors of the track with the position and identification magnets of the mover.

Referring to FIG. 3, the sensor arrays 55 of the track 12 may include position sensors 44, such as AMR sensors or linear encoders, for detecting a precise position of the mover 18 along the track 12. The position sensor 44 may provide position feedback to the power and control system 28 (and the drive circuitry 26) indicating the position of the mover 18 as well as the velocity, acceleration, and so forth of each mover 18 as desired.

The position sensors 44 may be spaced along the track 12 so that the detection range of each sensor 44 permits full detection along the entire length of the track 12. For example, the sensors 44 may be a plurality of linear encoders spaced at fixed positions along the track 12, and that interact with the magnet component 22 of mover 18 to provide signals to the control system 28 for sensing a mover's position along the track 12 but not the mover's identity. The position sensors 44 may be as described in U.S. Pat. No. 9,511,681, entitled "Controlled motion system having an improved track configuration," and US Patent Publication No. 2014/0265645, entitled "Controlled motion system having a magnetic flux bridge joining linear motor sections," both assigned to the present applicant, and both of which are hereby incorporated by reference.

Figure 5:
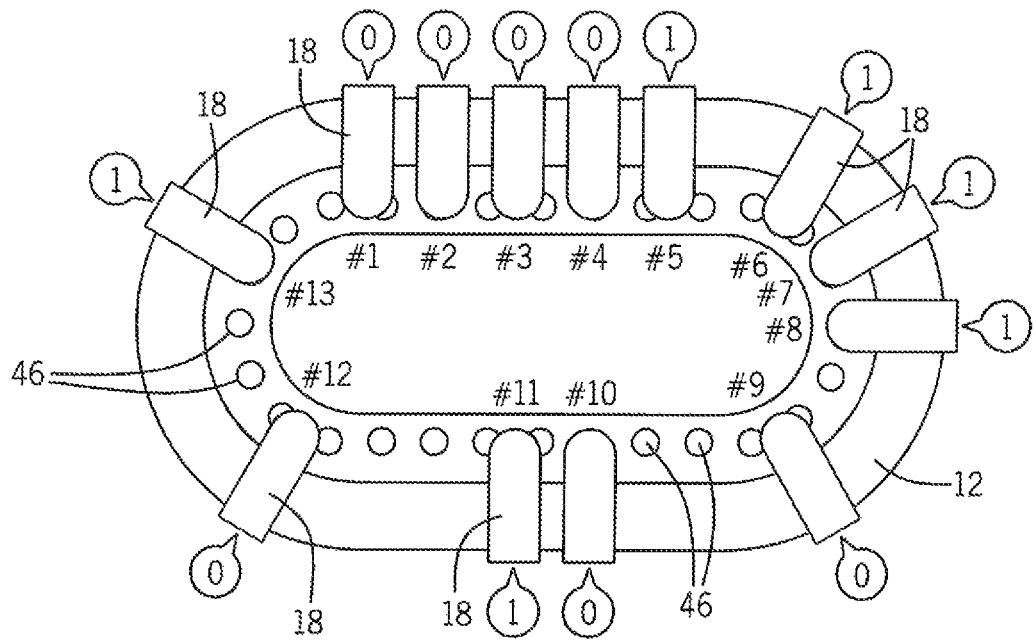
FIG. 5 is a representative diagram of a top view of the track showing placement of the mover identification sensors around the track of FIG. 2 and movers installed on the track.

Referring to FIG. 5, the sensor arrays 55 of the track 12 may also include identification sensors 46, such as flux gate sensors, for providing a magnetic signal (e.g., flux output signal) for each mover 18 on the track 12. The identification sensors 46 may provide the magnetic signals to the power and control system 28 (and the drive circuitry 26) indicating a mover identification, as further described below.

The identification sensors 46 are spaced along the track 12 so that the detection range of each sensor 46 permits full detection along the entire length of the track 12. For example, Hall switches can typically have a detection range of fractions of millimeters to 60 mm on average, so the Hall switches can be spaced a fairly large distance (60 mm) apart while still allowing the entire length of the track 12 is detected. However, the sensors 46 are also spaced so that two movers 18 cannot be detected at the same time. As such, the identification sensors 46 are spaced approximately less than half the width (defined as the dimension of the mover frame along the transport direction 11 when installed on the track 12) of the movers 18. For example, the width of the movers 18 generally range between 50 and 150 mm so the identification sensors 46 are typically arranged 25 to 30 mm apart along the track 12. Then the detection range of the identifications sensors 46 can be adjusted to about the 25 to 30 mm range.

Figure 4:
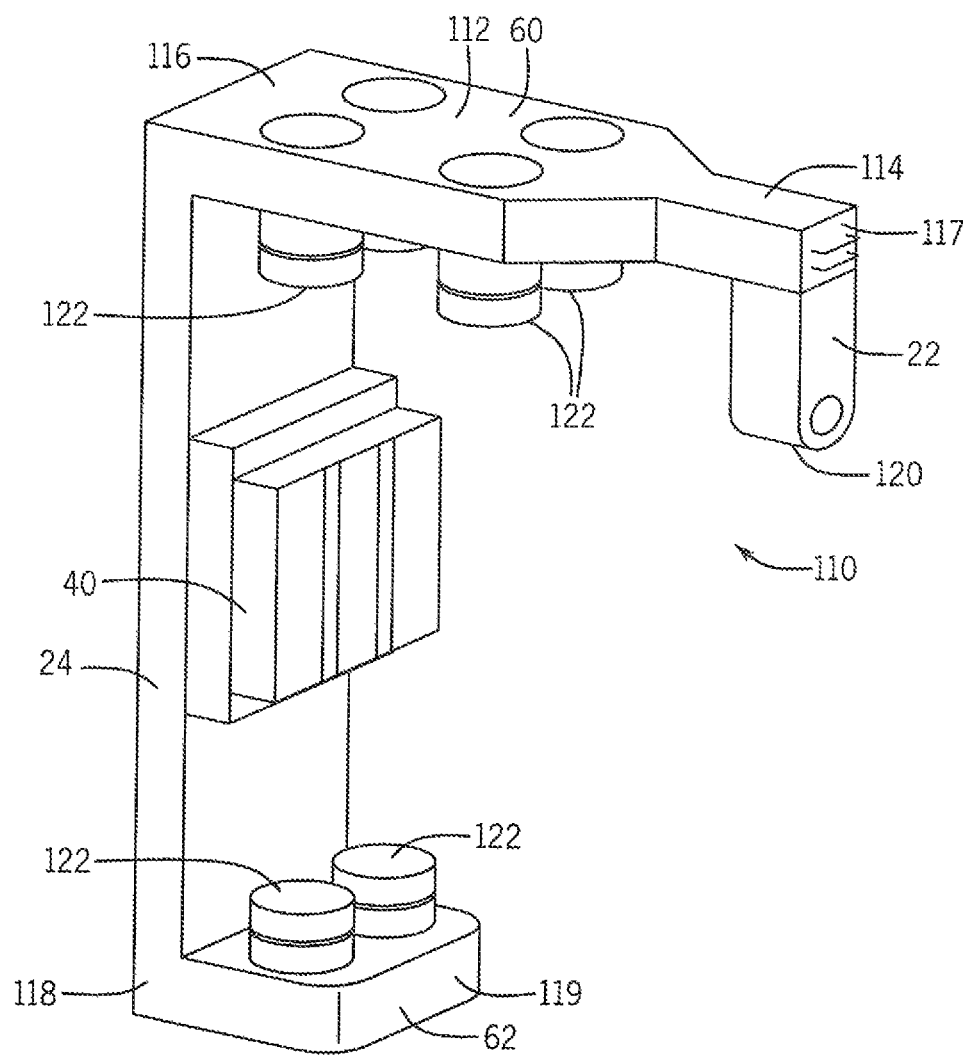
FIG. 4 is a perspective view of the mover frame showing placement of the mover identification magnet on the mover frame.

Referring to FIG. 4, each mover 18 comprises lateral mounting arms 60, 62 extending around the track 12 and engaging the track 12 to remain securely attached thereon. An upper mounting arm 60 having a generally rectangular section 112 tapering toward a rounded distal end 114 extends horizontally and substantially parallel to a generally rectangular lower mounting arm 62 connected at their rear ends 116, 118, respectively, by a rectangular vertical mounting platform 24 extending therebetween. The mounting platform 24 extends opposite an open front end 110 provided between distal ends 117, 119 of the upper mounting arm 60 and lower mounting arm 62, respectively, and receiving an outer receiving edge of the track 12. When mounted to the track 12, the upper mounting arm 60 and lower mounting arm 62 extend parallel to the top edge 21 and lower edge 25, respectively, and the mounting platform 24 extends along a vertical axis parallel to the outer surface 20, so as to resemble a C-shaped frame extending around the peripheral attachment edges or surfaces of the vertically extending wall 13.

In the alternative embodiment shown in FIG. 2, when mounted to the track 12, the upper mounting arm 60 and lower mounting arm 62 extend parallel to the inner surface 23 and outer surface 20, respectively, and the mounting platform 24 extends along a horizontal axis parallel to the top edge 21, so as to resemble a reversed U-shaped frame extending around the upper edges or surfaces of the vertically extending wall 13.

Referring again to FIG. 4, the upper mounting arm 60 and lower mounting arm 62 have wheels 122 that engage with lateral rails of the track 12 to allow the mover 18 to provide a precise positional relationship between the movers 18 and the track 12 in close proximity for strong magnetic coupling while allowing relatively free movement of the movers 18 along the track modules 14, 16 against the loads and forces of mechanical loads on the mover 18 during motion.

The mover 18 comprises a magnet component 22 extending downwardly from the distal end 117 of the upper mounting arm 60. The magnet component 22 may be a generally rectangular projection with a rounded distal tip 120 extending downwardly and contacting or communicating with the sensor array 55 provided in the inner surface 23 or top edge 21 of each track module 14, 16 described above.

Referring to FIGS. 3 and 4, the magnet component 22 may include a position magnet 52, such as a permanent magnet, communicating with the position sensors 44 along the track 12. The position sensors 44 of the track 12 detect the presence of the position magnet 52 when the mover 18 is installed on the track 12 (either in motion or stationary) so that a precise location of a mover 18 may be detected upon start up, however, without identifying the specific mover 18.

The magnet component 22 may also include an identification magnet 54, such as a permanent magnet, electromagnet or temporary magnet, communicating with the identification sensors 46 along the track 12. The identification sensors 46 detect a flux state for a nearby mover 18 on the track (either in motion or stationary) to produce a magnetic character signal that can be used to identify the specific mover 18.

The position magnet 52 and identification magnet 54 may be part of the magnet component 22 (as shown) or extend as separate components from the mover 18 frame. For example, in one embodiment the position magnet 52 is part of the proximal end of the magnet component 22 and the identification magnet 54 is part of the distal end of the magnet component 22. In this respect, the distinct relative positions of the position magnet 52 and identification magnet 54 along the length of the magnet component 22 are used to distinguish detection of each. In an alternative embodiment, the identification magnet 54 and position magnet 52 are separate components of the upper mounting arm 60 (of other part of the mover 18 frame) so that the distinct relative positions of the position magnet 52 and identification magnet 54 along the upper mounting arm 60 may be used to distinguish detection of each.

The locations of the position sensors 44 and identification sensors 46 on the track 12 may correspond with the relative positions of the respective magnets 52, 54 when the mover 18 is installed on the track 12 so that the detection of each magnet 52, 54 may be distinguished. Use of a steel holder or plate may help shield the magnetic effects of each magnet 52, 54 from the detection of the other.

The position sensors 44 and identification sensors 46 may communicate with the power and control system 28 (and drive circuitry 26) and share information. The position sensors 44 may share position information to affect operation of the identification sensors 46. For example, the position sensors 44 may determine the location of each movers 18, not mover identity, so that the appropriate identification sensors 46 may be read by the power and control system 28. The identification sensors 46 can then detect a magnetic state for each mover 18. In this manner, a flux output signal indicating that the mover 18 has no magnet will not be confused with the absence of a mover 18 at that particular location.

Referring to FIG. 5, the identifying signal, e.g., flux output signal, of the movers 18 may be used to produce a sequence of characters, e.g., number, letters, or other identifying character, by which the movers 18 are arranged. This sequence of characters may have unique subsequences, less the length of the sequence, that allow the system to identify every mover 18 of the sequence by sampling the subsequences of movers 18 in the full sequence. It is understood that any number alphabet may be used to form the mover sequence, however, a binary alphabet is described below.

In one exemplary embodiment of the present invention, each mover 18 is assigned a digit from a binary alphabet, i.e., logical true (1) or logical false (0) value. The assignment of a binary digit or bit to each mover 18 may be accomplished through the presence or absence of a mover identification magnet 54, such as a permanent magnet, on the mover 18. For example, a mover 18 having a permanent magnet may be assigned a 1 and a mover 18 without a permanent magnet may be assigned a 0. In this respect, some movers 18 will be installed with a mover identification magnet 54 and some will not have a mover identification magnet 54 thereon.

It alternative embodiments it may be desired to install every mover 18 with a mover identification magnet 54 so that the replacement or substitution of movers 18 is made easier. The mover identification magnet 54 may be an electromagnet that is set to an excited state or non-excited state. For example, a mover 18 having an electromagnet in an excited state may be assigned a 1 and a mover 18 having an electromagnet in an unexcited state may be assigned a 0.

In an alternative embodiment, the mover identification magnet 54 may be a temporary magnet that is magnetized or demagnetized. For example, a mover 18 having a temporary magnet that is magnetized may be assigned a 1 and a mover 18 having a temporary magnet that is in an unexcited state may be assigned a 0.

The movers 18 may be assigned a binary bit (i.e., 0 or 1) according to their magnetic characteristic, and this sequence of binary digits is associated with a De Bruijn sequence providing a cyclic sequence of numbers in which every possible subsequence occurs exactly once as a substring (i.e., as a contiguous subsequence). Generally the length of the De Bruijn sequence will be set to the number of movers and the length of the subsequence will be minimized. The subsequence is generally less than half the number of movers or less than one-quarter of the number of movers, especially for more than six movers.

Examples of De Bruijn sequences are provided below:

Example 1

For a binary alphabet {0,1}, the following subsequences of order n=3 (e.g. subsequence length) are possible distinguishing five different movers each associated with the following subsequence:

| | | |
|---|---|---|
| 100 | 001 | 110 |
| 000 | 010 | |

Each of the five subsequence can be represented by the following De Bruijn sequence: 10001 indicating the settings of the magnets on each mover and uniquely identifying five movers each identified by a single binary digit. Each subsequence of n=3 digits is represented exactly once as a substring of the De Bruijn sequence of length L=5.

Example 2

For a binary alphabet {0,1}, the following subsequences of order n=4 (e.g., subsequence length) are possible distinguishing thirteen different movers each associated with the following subsequences:

| | | |
|---|---|---|
| 0000 | 1110 | 1010 |
| 0001 | 1100 | 0100 |
| 0011 | 1001 | 1000 |
| 0111 | 0010 | |
| 1111 | 0101 | |

Each of the thirteen subsequences can be represented by the following De Bruijn sequence: 0000111100101 indicating the settings of the magnets on each mover and uniquely identifying 13 movers each identified by a single binary digit. Each subsequence of n=4 digits is represented exactly once as a substring of the De Bruijn sequence of length of L=13. This example is represented in FIG. 5

Example 3

For a binary alphabet {0,1}, the following subsequences of order n=5 (e.g., subsequence length) are possible distinguishing thirty two different movers each associated with the following subsequences:

| | | |
|---|---|---|
| 00000 | 00101 | 10110 |
| 00001 | 01010 | 01101 |
| 00010 | 10100 | 11011 |
| 00100 | 01001 | 10111 |
| 01000 | 10011 | 01111 |
| 10001 | 00111 | 11111 |
| 00011 | 01110 | 11110 |
| 00110 | 11101 | 11100 |
| 01100 | 11010 | 11000 |
| 11001 | 10101 | 10000 |
| 10010 | 01011 | |

Each of the thirty-two subsequences can be represented by the following De Bruijn sequence: 00000100011001010011101011011111 indicating the settings of the magnets on each mover and uniquely identifying 32 movers each identified by a single binary digit. Each subsequence of n=5 digits is represented exactly once as a substring of the De Bruijn sequence of length of L=32.

A De Bruijn sequence of length L may be assigned for any arbitrary number of L movers that are installed on the track 12. Depending on the length L of the De Bruijn sequence and number of movers L, the order n of the subsequences may vary. The order n represents that shortest number of consecutive movers 18 that need to be sampled in order to determine the identity of every mover 18 in the De Bruijn sequence. For example, for L=5 to 8, n=3; for L=9 to 16, n=4; and for L=17 to 32, n=5. The number of movers 18 sampled is generally minimized to n.

Figure 6:
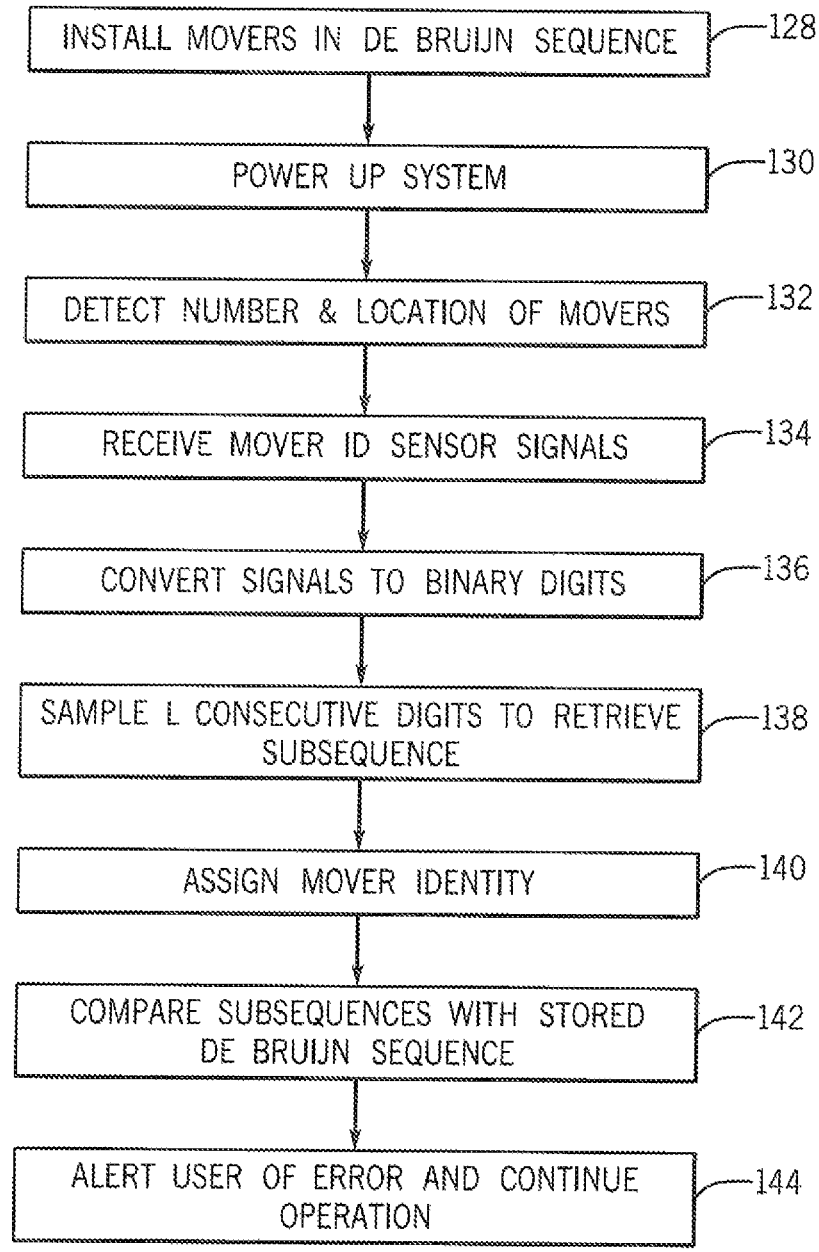
FIG. 6 is a flow diagram showing the operation of the mover sequence to determine a mover identification.

In operation and referring to FIG. 6, depending on the number of movers L on the track 12, the movers 18 are given a magnetic identity (0 or 1) and installed on the track 12 according to a De Bruijn sequence of length L, as shown in step 128. The De Bruijn sequence may be determined by a De Bruijn sequence generator known in the art, e.g., found at http://www.hakank.org/comb/debruijn.cgi, hereby incorporated by reference.

After powering up of the system, as shown in step 130, the power and control system 28 (and the drive circuitry 26) detects the number of movers 18 on the track 12 and the location of each mover 18, as shown in step 132. This allows the power and control system 28 (and the drive circuitry 26) to share information about the mover locations and where the identification sensors 46 should be read.

Next, the power and control system 28 (and the drive circuitry 26) receives the mover identification sensor signals at the mover locations, as shown in step 134. The mover identification sensor signals are then converted to a binary digits or bits, i.e., 0 or 1, to form a detected sequence of binary numbers, as shown in step 136.

Next, the power and control system 28 (and the drive circuitry 26) then samples n consecutive digits from the detected sequence, as shown in step 138. The sampled subsequences are used to identify each mover 18 on the track 12 based upon preassigned "first, second, third, etc." mover positions, as shown in step 140. For example, in Example 3 above, the designated "first" mover may be the first 0 in the subsequence 0000, the designated "second" mover may be the first 0 in the subsequence 0001, and so forth as shown in FIG. 5.

Additional subsequences may be sampled. During the retrieval of the sampled subsequences, the subsequences may be compared with the expected list and order of the De Bruijn subsequences associated with movers 18, as shown in step 142. If there is a discrepancy detected between the sampled subsequences and the De Bruijn subsequences, the system may provide an error signal alerting the operator of a sequence error, as shown in step 144. Once the error has been identified (i.e., the mover in the wrong order or with the wrong mover identification), the operation may resume. The system has a built-in redundancy that allows the sequence error to be corrected in software instead of needing to physically move the "out of place" movers to the right positions. The built-in redundancy allows the proper mover identification sequence to be determined despite the error and for the operation of the system to resume.

For example, in Example 3 above, the designated "first" mover may be the first 0 in the subsequence 0000 and the designated "second" mover may be the first 0 in the subsequence 0001. If the "second" mover has the incorrect magnetic identity and is assigned a "1" instead of "0", the first subsequence will be 0100 instead of 0000. This will be the same subsequence as the fifth subsequence so the system knows there is an error. However, the sixth subsequence will still be correct so the system is able to determine that the error is occurring at the first subsequence not the fifth subsequence, and that the thirty-first, thirty-second, first and second subsequences contain an error. The incorrect subsequences indicate that the second mover should be a "0" instead of a "1".

While magnetic sensing is described above, other types of sensors and sensing schemes may also be used, such as electro-optical, capacitive, eddy current, inductive, string potentiometer, or other known sensing methods.

While a horizontal configuration is illustrated in FIG. 1, other orientations may also be provided, such as ones in which the illustrated oval is generally stood on a side or end, or at any angle between. It should be noted that other configurations are equally possible. The configurations may form closed loops of various shapes, but may also comprise open-ended segments.

As will be appreciated by those skilled in the art, in many applications, the transport system 10 will be configured to inter-operate with other machines, robots, conveyers, control equipment, and so forth (not shown) in an overall automation, packaging, material handling or other application. The transport system 10 may be a linear motor system as described in US Patent Publication No. 2014/0331888, entitled "Controlled Motion System Having an Improved Track Configuration," assigned to the present application, and hereby incorporated by reference.

Certain terminology is used herein for purposes of reference only, and thus is not intended to be limiting. For example, terms such as "upper", "lower". "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context. When elements are indicated to be electrically connected, that connection may be direct or through an intervening conductive element.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A mover system providing a mover traveling along a track, the mover system comprising:
   a mover frame supporting a mover sensor element;
   a track frame providing a path along which the mover frame travels and supporting track sensor elements for interacting with the mover sensor element of the mover frame;
   wherein the interaction between the mover sensor element and track sensor elements provides an identification signal for each mover that is not unique to that mover; and
   wherein the identification signal for each mover on the track follows a cyclic sequence where contiguous substrings of the cyclic sequence of a predetermined length less than the length of the cyclic sequence occur only once within the sequence.

2. The mover of claim 1 wherein the identification signal is binary, being either a logical true or logical false value.

3. The mover of claim 1 wherein the predetermined length is less than one half a number of movers on the track.

4. The mover of claim 1 wherein the predetermined length is less than one-fourth a number of movers on the track.

5. The mover of claim 1 wherein the cyclic sequence provides a smallest possible predetermined length for a number of movers on the track.

6. The mover of claim 1 wherein the cyclic sequence is a De Bruijn sequence of order n on a size-k alphabet where n is the predetermined length and k is a number of movers on the track and every possible order n string occurs once within the sequence as a contiguous subsequence.

7. The mover of claim 1 wherein the mover sensor element is at least one of a permanent magnet, electromagnetic magnet and temporary magnet.

8. The mover of claim 7 wherein the track sensor elements is at least one of a flux gate switch, Hall effect sensor, giant magnetoresistance (GMR) sensor, magnetic tunneling junction (MTJ) sensing, and anisotropic magnetoresistance (AMR) sensor.

9. The mover of claim 8 wherein the track sensor elements are spaced along a length of the track wherein the spacing of the track sensor elements is less than half a width of the mover frame, the mover width extending along a direction of the track.

10. The mover of claim 1 further comprising an electronic computer communicating with the track sensor elements and executing a program to:
    receive the identification signals of the track sensor elements to produce a sequence of characters;
    sample n consecutive characters to determine a subsequence;
    determine an identity of each mover based upon the subsequence.

11. The mover of claim 10 further comprising executing a program to:
    compare the sequence of characters with a stored sequence;
    produce an error signal if the sequence of characters does not match the stored sequence.

12. The mover of claim 1 further comprising a second frame sensor element supported on the mover frame and second track sensor elements for interacting with the second frame sensor element of the mover frame wherein the interaction between the second frame sensor element and the second track sensor elements provides a mover location of each mover.

13. The mover of claim 12 wherein the first and second track sensor elements are installed on a common printed circuit board (PCB) of the track.

14. The mover of claim 1 wherein the track sensor elements are configured to detect the identification signal of each mover when the movers are stationary.

15. The mover of claim 1 wherein the identification signal is non-unique for each mover.

16. The mover of claim 15 wherein the identification signal is a magnetic state sensed by the mover sensor element.

17. A mover system providing a mover traveling along a track, the mover system comprising:
   a mover frame supporting a magnetic element;
   a track frame providing a path for which the mover frame travels and supporting sensor elements for interacting with the magnetic element of the mover frame;
   wherein the interaction between the magnetic element and sensor elements provides a magnetic character for each mover; and
   wherein the magnetic characters of the movers on the track are arranged according to a cyclic sequence where unique contiguous substrings occur only once within the sequence.

18. A method of identifying movers supporting magnetic elements on a track assembly supporting sensor elements, the method comprising the steps of:
   mounting the movers to the track assembly;
   receiving a magnetic character of the sensor elements to produce a sequence;
   sampling consecutive characters of the sequence to define a unique subsequence; and
   determining an identity of each mover according to the unique subsequence.

19. The method of claim 18 further comprising comparing the sequence to a pre-stored sequence; and detecting a discrepancy between the sequence and the pre-stored sequence.

* * * * *